United States Patent [19]
Miller et al.

[11] Patent Number: 6,033,710
[45] Date of Patent: *Mar. 7, 2000

[54] MOUTHFEEL AND LUBRICITY ENHANCING COMPOSITION

[75] Inventors: Mark S. Miller, Arlington Heights; Kevin J. Surber, Hoffman Estates; Daniel G. Lis, Schaumburg, all of Ill.; Robert W. Martin, Jr., San Ramon, Calif.; Gerard L. Hasenhuettl, Deerfield, Ill.

[73] Assignee: Kraft Foods, Inc., Northfield, Ill.

[*] Notice: This patent is subject to a terminal disclaimer.

[21] Appl. No.: 08/928,609

[22] Filed: Sep. 12, 1997

Related U.S. Application Data

[63] Continuation of application No. 08/609,458, Mar. 1, 1996, abandoned.

[51] Int. Cl.[7] .................................... A23D 9/007
[52] U.S. Cl. .......................... 426/564; 426/566; 426/611
[58] Field of Search .................... 426/531, 601, 426/602, 603, 608, 611, 804, 564, 565, 566, 570, 572

[56] References Cited

U.S. PATENT DOCUMENTS

| | | | |
|---|---|---|---|
| 3,924,018 | 12/1975 | Sims | 426/564 |
| 3,928,648 | 12/1975 | Stahl | 426/564 |
| 4,242,364 | 12/1980 | Buddemeyer | 426/471 |
| 4,396,638 | 8/1983 | Edo | 426/602 |
| 4,492,714 | 1/1985 | Cooper | 426/602 |
| 4,680,184 | 7/1987 | Seiden | 426/654 |
| 5,620,734 | 4/1997 | Wesdorp | 426/602 |
| 5,626,903 | 5/1997 | Gautchier | 426/611 |
| 5,658,609 | 8/1997 | Abboud | 426/285 |
| 5,736,117 | 4/1998 | McGinley | 426/573 |

FOREIGN PATENT DOCUMENTS

| | | |
|---|---|---|
| 521543 | 2/1992 | European Pat. Off. . |
| 547647 | 6/1993 | European Pat. Off. . |
| 513187 | 10/1996 | European Pat. Off. . |
| WO 94/12063 | 6/1994 | WIPO . |

*Primary Examiner*—Carolyn Paden
*Attorney, Agent, or Firm*—Fitch, Even, Tabin & Flannery

[57] ABSTRACT

A mouthfeel and lubricity enhancing composition for use in reduced fat food products is provided. The composition is an aqueous gel matrix of ester vesicles which is provided by a mixture of diacetyl tartaric acid mono fatty acid glyceride ester and a second ester having a hydrophilic-lipophilic balance of above about 10 and a melting point above about 100° F.

28 Claims, 2 Drawing Sheets

MOUTHFEEL AND LUBRICITY ENHANCING COMPOSITION

CROSS-REFERENCE TO RELATED APPLICATION

This application is a continuation-in-part of application Ser. No. 609,458 filed Mar. 1, 1996 now abandoned.

FIELD OF THE INVENTION

The present invention relates generally to reduced fat food products. More particularly, the present invention relates to a mouthfeel and lubricity enhancing composition which is an aqueous matrix of ester vesicles for use in reduced fat and full fat food products.

BACKGROUND OF THE INVENTION

In recent years, many efforts have been made to reduce the fat content of various foods, such as salad dressing, sour cream and frozen desserts. A problem encountered when the fat level is reduced in conventional food products is that the organoleptic properties are changed because of the lubricity and slipperiness imparted by the fat particles suspended in the food product is removed.

The term "salad dressing" refers to salad dressing as defined by the U.S. Food and Drug Administration Standards of Identity. Salad dressing, as thus defined, is the emulsified food product prepared from an edible vegetable oil, an acidifying ingredient selected from vinegar, lemon juice or lime juice, an egg-yolk containing ingredient and a partially or fully cooked starch paste prepared from a food starch. Salad dressings may also contain optional emulsifying ingredients in addition to egg yolk and cooked starch paste. Such additional emulsifying ingredients which are recognized by the FDA Standards of Identity, include gum acacia, carob bean gum, guar gum, gum karaya, gum tragacanth, carrageenan, pectin, propylene glycol ester of alginic acid, sodium carboxymethyl cellulose or any mixture of two or more of such hydrocolloid emulsifying ingredients. A salad dressing, as defined by the FDA Standards of Identity, contains not less than 30% by weight of vegetable oil and not less egg-yolk containing ingredients than is equivalent to egg yolk solids provided by liquid egg yolk at a level of 4% by weight.

Fat-free salad dressing products have been developed which duplicate the viscosity and other textural attributes of the missing fat by means of suitable food polymers, such as gums (xanthan or alginate), cellulose and its derivatives, starches and various microparticulated polymeric complexes. What is missing in these products is the oiliness (lubricity) and thermal effects in the mouth which are present in the full fat products.

The aqueous matrix of ester vesicles which are provided by the present invention have been shown to have an impact on lubricity in fat-free salad dressing products which can be measured in two ways: decreased frictional coefficient using an instrumental technique and increased time and intensity of slipperiness using trained testers. Other benefits, which have been observed, include: residual oily mouthfeel, decreased product pastiness, modulation of flavor impact, better dispersion of dry ingredients, increased functionality of fat mimetics and decreased product density.

Many efforts have been directed to improving the mouthfeel and lubricity of reduced fat food products. PCT Application WO94/12063 to Bee, for example, is directed to a food product, such as low-fat spreads, dressings, cheese and sauces, which include gas cells prepared from a mixture of emulsifiers having a thermodynamic stability in excess of two weeks and wherein more than 90% of the gas cells have an average particle size of less than 20 microns.

U.S. Pat. No. 5,652,011 to Heertge, et al. is directed to a spread or dressing which includes a mesomorphic phase. The product contains from 0 to 20 weight percent of fat, from 0.05 to 30 weight percent of a biopolymer, which can be a gum, and from 0.1 to 30 weight percent of an edible surfactant.

It is an object of the present invention to provide a composition which can be used in food products having reduced fat or no fat to enhance the mouthfeel and lubricity.

A further object of the present invention is to provide food products having an enhanced lubricity imparted by incorporating the lubricity enhancing composition of the present invention in the food product.

SUMMARY OF THE INVENTION

A mouthfeel and lubricity enhancing composition for use in reduced fat food products is provided. The composition is an aqueous gel matrix of ester vesicles which is provided by a mixture of a first ester which is diacetyl tartaric acid mono fatty acid glyceride ester and a second ester having a hydrophilic/lipophilic balance (HLB) above about 10 and a melting point above about 100° F. The second ester can be selected from the group consisting of mono-, di- and tri-fatty acid esters of sucrose, polyglycerol fatty acid esters, decaglycerol monostearate and sodium stearoyl lactylate.

DETAILED DESCRIPTION OF THE INVENTION

Figure 1:
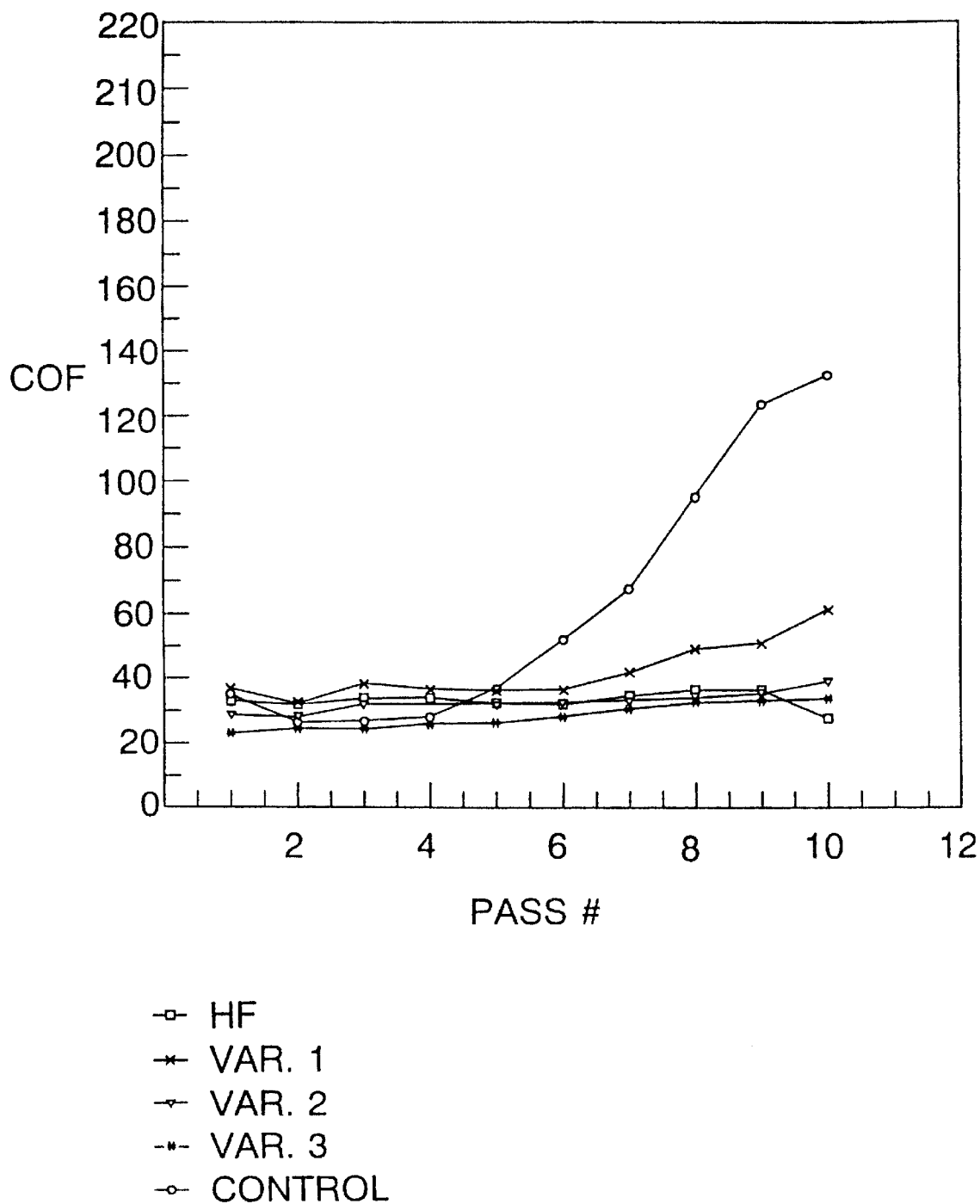
FIG. 1 is a plot of the coefficient of fraction after a particular number of passes through a friction measurement device for various salad dressing formulations.

Generally, the present invention is directed to an aqueous composition which imparts enhanced mouthfeel and lubricity to reduced fat food products. Such food products include pourable dressings, mayonnaise type dressings, frozen desserts, whipped topping, cheese and other dairy products. The reduced fat food products can have from 0 to about 20% of fat. The composition is an aqueous gel matrix of ester vesicles. The ester vesicles are provided by a mixture of a first ester which is diacetyl tartaric acid mono fatty acid glyceride ester and a second ester having an HLB above about 10 and a melting point above about 100° F. In an important embodiment of the invention, the second ester is selected from the group consisting of mono-, di- and tri-fatty acid esters of sucrose, polyglycerol fatty acid esters, decaglycerol monostearate and sodium stearoyl lactylate. The preferred sucrose fatty acid is sucrose mono- fatty acid ester.

For technological purposes, it is useful to be able to classify emulsifiers according to their stabilizing efficiency for a particular type of emulsion. A well established empirical procedure for doing this is the hydrophile-lipophile balance (HLB) method of W. C. Griffin, *J. Soc. Cosmetic Chem.*, 1, 311 (1949). It is based upon the idea that for a given oil and water system, there is an optimum balance between molecular hydrophilic and lipophilic character which leads to maximum emulsification efficiency. Emulsifiers with low HLB numbers (i.e., in the range of 4–6) are suitable for preparing water-in-oil emulsions, while those with high HLB numbers (i.e., in the range of 9–18) are suitable for oil-in-water emulsions. Emulsifiers with intermediate or medium HLB numbers (6–9) are suitable for either type of emulsion depending upon ratio of oil and water, temperature and other conditions.

HLB numbers may be determined experimentally by the method originally described by Griffin, or empirically using the formula of J. T. Davies, *Proc. 2nd Int. Cong. Surface Activity*, Vol. 1, p. 426 (1957):

$$HLB = 7 + \sum_i n_H(i) - \sum_j n_L(j)$$

in the above equation, $n_H(i)$ and $n_L(j)$ are empirically-derived individual group numbers for the hydrophilic groups (i) and lipophilic groups (j) assigned by Davies.

Using the empirical method, HLB values for specific emulsifiers useful in this invention are as follows: Diacetyl tartaric acid monostearate glyceride, HLB 8; sucrose monostearate, HLB 16; decaglycerol monostearate glyceride, HLB 13; sodium stearoyl lactylate, HLB 21. It should be noted that group numbers for charged residues depend on the ionic strength of the aqueous phase. Therefore, although the calculated HLB value for sodium stearoyl lactylate is 21, an experimentally derived HLB value would be closer to 12. The sucrose esters are mixtures of molecules with various degrees of esterification. Although the monoesters have HLB values of 16 or more, as more esters are added the molecules become more lipophilic and the HLB value decreases. A wide range of HLB values can be obtained from HLB 0 to HLB 18 depending on the number and chain length of the esters. The sucrose esters most preferred for this invention are those with HLB values greater than 10.

Key considerations for the fatty acid ester substituent of the emulsifier components are melting point and crystallization. Typical cis unsaturated fatty acids have very low melting points and would therefore be unsuitable for this invention. Furthermore, if cis unsaturated fatty acids with very low melting points occur in a mixture, they would disrupt the crystal packing and destroy the lamellar nature of the complexes needed for this invention to work. On the other hand, trans unsaturated fatty acids may work very well. They have high melting points and crystallize.

The preparation of sucrose fatty acid esters useful in the present invention is described in U.S. Pat. No. 5,565,557. The preparation of polyglycerol fatty acid esters useful in the present invention is described in U.S. Pat. No. 3,637,774.

The fatty acid of the diacetyl tartaric acid mono fatty acid glyceride ester is selected from the group consisting of saturated and unsaturated $C_6$–$C_{22}$ fatty acids. Preferred saturated fatty acids are stearic acid, and palmitic acid. Preferred unsaturated fatty acids are long chain ($C_{16}$–$C_{22}$) trans unsaturated fatty acids. The fatty acid of the sucrose fatty acid and polyglycerol fatty acid esters is also selected from the group consisting of saturated and unsaturated $C_{16}$–$C_{22}$ fatty acids. The preferred saturated fatty acids for the sucrose fatty acid esters and polyglycerol fatty acid esters are stearic acid and palmitic acid. Preferred unsaturated fatty acids are long chain ($C_{16}$–$C_{22}$) trans unsaturated fatty acids. Key considerations in selection of fatty acids are the melting point and crystallization of the fatty acid esters. The preferred fatty acids all result in esters which have melting points above 100° F. and which easily crystallize upon cooling to temperatures below their melting point. The most preferred fatty acids for all esters are long chain ($C_{16}$–$C_{22}$) saturated fatty acids.

The mixture of esters to provide the ester vesicles contains diacetyl tartaric acid mono fatty acid glyceride ester at a level of from about 25% to about 75% by weight. All percentages used herein are by weight unless otherwise indicated. The second ester is also present at a level of from about 25% to about 75% by weight. The preferred mixture contains from about 60% to about 40% of each of the first ester and second ester.

Figure 2:
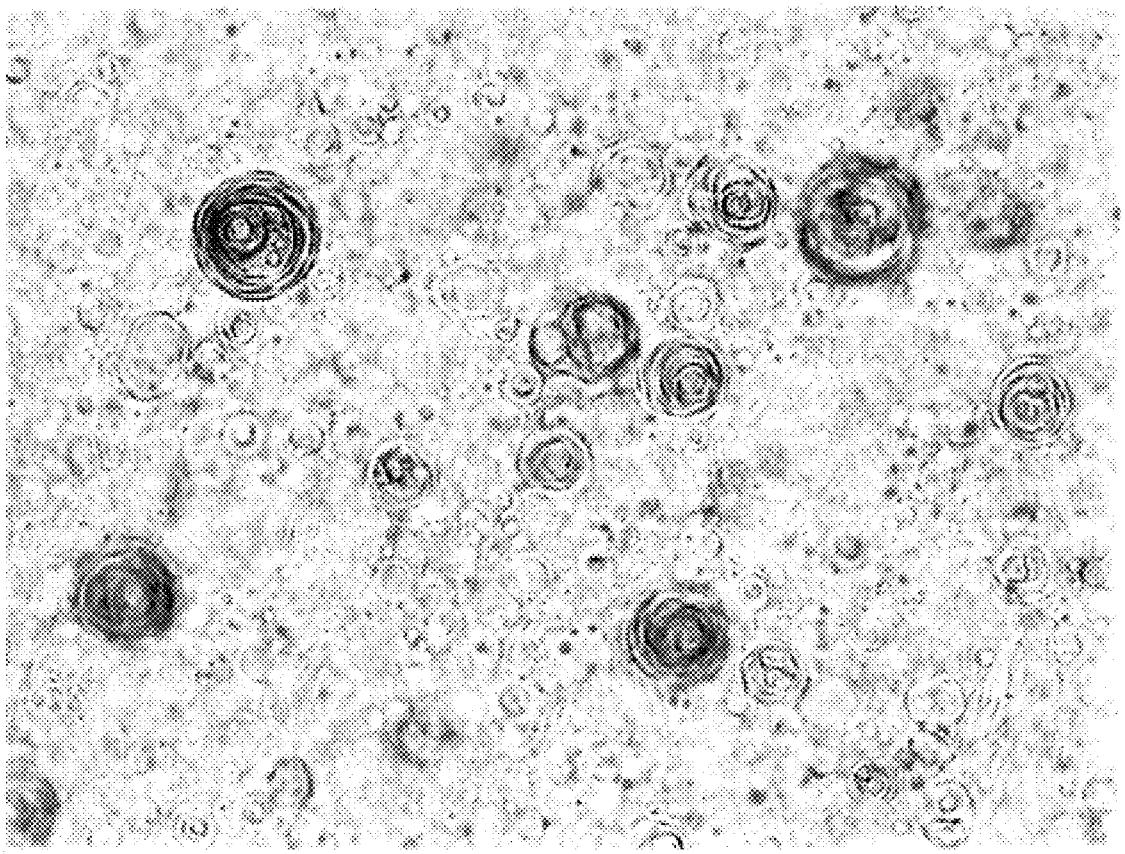
FIG. 2 is a photomicrograph of the aqueous gel matrix of ester vesicles of the present invention having a 12% level of a 50/50 mixture of diacetyl tartaric acid monostearate glyceride and sucrose monostearate taken at 780×.

To prepare the aqueous compositions of the invention, it is important to provide a well blended homogeneous mixture of the dry powdered esters prior to dispersing the esters in water in a kettle. If necessary, when the ester is not a dry powder at ambient temperature, the ester may be frozen and ground to a powder while frozen. If the first and second esters are added individually to the water, the mixture does not form an aqueous gel. The mixture of esters are present in the water at a level of from about 2% to about 20%. The dispersion is stirred with a suitable mixer, such as a propeller mixer, as it is heated to a temperature of from about 180° F. to about 200° F. over a period of from about 10 minutes to about 30 minutes. The heated dispersion is then cooled to about 130° F. to about 150° F. within 30 minutes while continuing stirring. The mixture can then be permitted to cool to ambient temperature without stirring. For very small batches of less than about 1000 grams, stirring can be discontinued as soon as it reaches the desired elevated temperature. At the elevated temperature, the composition is a white milky fluid which gels upon cooling. The mixture of esters forms a complex in the form of multilamellar vesicles upon cooling to refrigeration temperatures. The ester vesicles are dispersed as a matrix in the aqueous medium. Under microscopic examination, the vesicles resemble the structure of an onion which appears to have alternating hydrophobic and hydrophilic layers with water trapped between the layers. FIG. 2 clearly shows the structure and shape of the vesicles. The vesicles range in size from about 1 micron to about 20 microns.

The mouthfeel and lubricity enhancing compositions of the present invention are used in reduced fat food products, particularly pourable dressings, mayonnaise type dressings, frozen desserts, whipped topping, cheese and other dairy products. The mouthfeel and lubricity enhancing aqueous gel matrix of ester vesicles is present in the food products to provide the ester vesicles at a level of from about 0.1% to about 3% by weight.

The following examples further illustrate the compositions of the present invention, but are intended to in no way limit the scope of the invention as set forth in the appended claims.

EXAMPLE 1

Various ester vesicle compositions in accordance with the invention were prepared having the following compositions of Table 1:

TABLE 1

| Ingredients | Var 1 Weight-gm | Var 2 Weight-gm | Var 3 Weight-gm | Var 4 Weight-gm |
| --- | --- | --- | --- | --- |
| Diacetyl tartaric acid monostearate glyceride | 3.75 | 7.5 | 11.25 | 10.0 |
| Sucrose monostearate | 3.75 | 7.5 | 11.25 | — |
| Polyglycerol fatty acid ester | — | — | — | 5.00 |
| Water | 250 | 250 | 250 | 250 |

The ester vesicle compositions were prepared by adding the blended esters and water into a kettle and heating the ingredients with vigorous stirring to a temperature of 190° F. over a period of 20 minutes to provide a white milky fluid which gelled on cooling to refrigeration temperatures to provide ester vesicles. The ester vesicle compositions set forth above were used to prepare a salad dressing type viscous dressing. A premix was first prepared having the compositions of Table 2.

TABLE 2

| Ingredients | Control Wt-gm | Var 1 Wt-gm | Var 2 Wt-gm | Var 3 Wt-gm | Var 4 Wt-gm |
| --- | --- | --- | --- | --- | --- |
| Water | 586.5 | 336.5 | 336.5 | 336.5 | 336.5 |
| Microcrystalline cellulose 9% dispersion in water | 112.5 | 102.5 | 95.0 | 87.5 | 95.0 |
| Soybean oil | 11.25 | 11.25 | 11.25 | 11.25 | 11.25 |
| Salt | 27.6 | 27.6 | 27.6 | 27.6 | 27.6 |
| Xanthan gum | 9.6 | 9.6 | 9.6 | 9.6 | 9.6 |
| Potassium sorbate | 3.75 | 3.75 | 3.75 | 3.75 | 3.75 |
| Titanium dioxide | 3.15 | 3.15 | 3.15 | 3.15 | 3.15 |
| Beta carotene | 0.2 | 0.2 | 0.2 | 0.2 | 0.2 |
| Vinegar | 3.6 | 3.6 | 3.6 | 3.6 | 3.6 |
| Lactic acid | 1.27 | 1.27 | 1.27 | 1.27 | 1.27 |
| $H_3PO4$ | 0.5 | 0.5 | 0.5 | 0.5 | 0.5 |
| EDTA | 0.07 | 0.07 | 0.07 | 0.07 | 0.07 |
| Ester vesicle composition - See Table 1 | 0 | 257.5 | 265.0 | 272.5 | 265.0 |

The above components were added to a Hobart™ planetary mixer and were blended until mixed. The mixture was then passed through a colloid mill to provide a homogeneous dispersion.

A starch base was then prepared having the following components at the indicated levels:

| Ingredient | Percent |
| --- | --- |
| Water | 74.5 |
| Vinegar | 4.87 |
| Sucrose | 10. |
| Lactic acid | 1.14 |
| Waxy maize starch | 9.5 |

The above ingredients were added to a kettle and were heated to 180° F. with stirring to provide a gelatinized starch mixture. Each of the premix compositions were added to an equivalent weight of the starch base to provide a 1:1 ratio of starch base to other components.

Each of the salad dressing compositions was then tested on a slip tester to determine the lubricity of the compositions. Also tested was a commercial full fat mayonnaise having 80% oil and a control reduced fat salad dressing which did not have the lubricity enhancing compositions of the invention. The slip tester includes a sliding plate and a sled attached to a capacitor. The test is performed with a fresh veal tongue. The salad dressing composition is spread onto one surface of the tongue and then removed with a straight edge to leave only a residue. The other surface of the tongue is attached to the sled and a liberal amount of the salad dressing is applied to the plate. The tongue rests on the salad dressing on the plate and the plate is repeatedly pulled across the tongue. The friction of the tongue on the plate energizes the capacitor which is attached to a readout device which is calibrated to read coefficient of friction.

The results of the slip testing are set forth in FIG. 1. As can be seen in FIG. 1, the commercial full-fat mayonnaise (Symbol □-designated HF) retains a substantially low coefficient of friction throughout 10 slidings of the plate. The four salad dressings having the mouthfeel and lubricity enhancing agent of the present invention also retain their lubricity throughout 10 slidings of the plate. The composition containing ester vesicle Var 4 substantially replicated the plot of the composition containing ester vesicle Var 2. The control fat-free sample (Symbol O-designated control) sample having none of the mouthfeel and lubricity enhancing agents of the present invention rapidly breaks down, resulting in a much higher coefficient of friction after 10 slidings of the plate.

Products made according to the formulations in Example 1 were subjected to sensory analysis for time and intensity of slipperiness. Full-fat mayonnaise achieves a maximum relative slipperiness, intensity of 12.3 which is detectable for 43 seconds. Fat-free mayonnaise has a maximum slipperiness of 6.35, detectable for 21 seconds. Fat-free mayonnaise made with the ester vesicles of the present invention has maximum slipperiness of 11.03, detectable for 37 seconds.

EXAMPLE 2

An aqueous gel matrix containing ester vesicles was prepared in accordance with the procedure of Example 1 containing 7.5 grams of diacetyl tartaric acid mono stearate glyceride and 7.5 grams of sucrose monostearate in 250 grams of water to provide ester vesicles dispersed in an aqueous gel. A premix was then prepared having the following composition:

| Ingredients | Control (no ester vesicles) Weight-grams | Var 1 Weight-grams | Var 2 Weight-grams |
| --- | --- | --- | --- |
| Water | 70.40 | 70.40 | 70.40 |
| Inulin | 10.00 | 10.00 | 10.00 |
| Corn Syrup (62 DE) | 2.4 | 1.52 | 2.4 |
| Xanthan gum | .55 | .55 | .55 |
| Potassium sorbate | .117 | .117 | .117 |
| Titanium dioxide | .25 | .25 | .25 |
| Salt | 1.014 | 1.014 | 1.014 |
| Vinegar | 1.923 | 1.923 | 1.923 |
| Lactic acid | .450 | .450 | .450 |
| Mayonnaise flavor | 4.21 | 4.21 | 4.21 |

-continued

| Ingredients | Control (no ester vesicles) Weight-grams | Var 1 Weight-grams | Var 2 Weight-grams |
| --- | --- | --- | --- |
| Diacetyl tartaric acid monostearate glyceride (from ester vesicles) | 0 | .54 | 1.05 |
| Sucrose monostearate (from ester vesicles) | 0 | .54 | 1.05 |
| EDTA | 0.07 | 0.07 | 0.07 |

The above components were added to a Hobart™ planetary mixer and were blended until mixed. The mixture was then passed through a colloid mill to provide a homogeneous dispersion.

A starch base was then prepared having the components set forth in Example 1 and prepared in accordance with the procedure of Example 1. The premix was added to an equivalent weight of the starch base to provide a 1:1 ratio of starch base to premix.

It was observed that the ester vesicles modulated the flavor of the dressing and formed a smoother product. There was no apparent benefit in doubling the level of the ester vesicles. Some tasters noted a residual oily mouth coating and decrease in pastiness. It was observed that there was an immediate dispersion of inulin and xanthan gum during the mixing without caking or fish eye formation. This resulted in a smooth creamy premix and provided optimum functionality of the inulin. The inulin gel had a rapid set-up. It was also observed that air incorporation could be established through use of the ester vesicles of the present invention. The incorporation of air reduced product density and could be used to provide a whipped sandwich spread.

Inulin based fat-free mayonnaise was made with the esters of the invention added either as individual ingredients or as the multilamellar vesicle ester complex made in accordance with Example 1. The following benefits were noted by various trained tasters of the product. The flavors in the ester vesicle containing product were more tied together. The acids and spices did not come across separately, as they did in the control, but were more integrated. Off notes in the ester vesicle containing product were not as apparent. The product with ester vesicles was much smoother than the product made with the esters in the non-complex form. Residual oily mouth coating and decreased pastiness was noted. The product with ester vesicles spread out smoothly in the mouth, whereas the control product with no emulsifiers moved as a mass. The appearance of the ester vesicle containing product was fluffier than the control with visible signs of aeration. The lighter texture of the aerated product helped enhance the perception of creaminess.

What is claimed is:

1. A mouthfeel and lubricity enhancing composition for low fat and non-fat food products comprising an aqueous gel matrix containing a dispersion of ester vesicles in water, wherein said ester vesicles are prepared from a homogeneous mixture of powdered esters that are dispersed in water and formed into an aqueous gel mixture, the powdered esters being a first ester which is diacetyl tartaric acid esters of mono fatty acid glyceride and a second ester having an HLB above about 10 and a melting point above about 100° F., wherein said aqueous gel matrix contains from about 80% to about 98% of water and from about 2% to about 20% of the ester mixture.

2. A composition in accordance with claim 1 wherein said second ester is selected from the group consisting of mono-, di- and tri- fatty acid esters of sucrose, polyglycerol fatty acid esters, decaglycerol monostearate and sodium stearoyl lactylate.

3. A composition in accordance with claim 2 wherein the fatty acid component of each of said first and said second esters is selected from the group consisting of palmitic and stearic acids.

4. A composition in accordance with claim 2 wherein the fatty acid component of each of said first and said second esters is selected from the group consisting of $C_{12}$–$C_{22}$ trans unsaturated fatty acids.

5. A composition in accordance with claim 2 wherein said second ester is a sucrose mono- fatty acid ester.

6. A composition in accordance with claim 2 wherein said second ester is a polyglycerol fatty acid ester.

7. A composition in accordance with claim 2 wherein said second ester is decaglycerol monostearate.

8. A composition in accordance with claim 2 wherein said second ester is sodium stearoyl lactylate.

9. A composition in accordance with claim 1 wherein the fatty acid component of each of said first and said second esters is selected from the group consisting of $C_6$–$C_{22}$ saturated and unsaturated fatty acids.

10. A composition in accordance with claim 1 wherein the fatty acid component of each of said first and said second esters is selected from the group consisting of $C_6$–$C_{22}$ saturated fatty acids.

11. A composition in accordance with claim 1 wherein each of said first and said second esters is present in the mixture at a level of from about 25% to about 75% by weight.

12. A food product containing the composition of claim 1.

13. A food product in accordance with claim 12 wherein said composition is present at a level sufficient to provide the ester mixture at a level of from about 0.1% to about 3%.

14. A method for making an aqueous gel matrix composition comprising;
   (a) providing a well blended homogeneous mixture of dry powdered esters of a first ester, which is diacetylated tartaric acid mono fatty acid glyceride ester, and a second ester having an HLB above about 10 and a melting point above about 100° F. and selected from the group consisting of sucrose fatty acid ester and polyglycerol fatty acid esters;
   (b) adding said homogeneous ester mixture to water to provide a dispersion;
   (c) heating said dispersion with mixing; and
   (d) cooling said dispersion to provide an aqueous gelled matrix containing dispersed ester vesicles provided by said ester mixture;
   wherein said aqueous gel matrix contains from about 80% to about 98% of water and from about 2% to about 20% of the ester mixture.

15. A composition in accordance with claim 14 wherein said second ester is selected from the group consisting of mono-, di- and tri- fatty acid esters of sucrose, polyglycerol fatty acid esters, decaglycerol monostearate and sodium stearoyl lactylate.

16. A method in accordance with claim 15 wherein the fatty acid component of each of said first and said second esters is selected from the group consisting of palmitic and stearic acids.

17. A method in accordance with claim 15 wherein the fatty acid component each of said first and said second esters is selected from $C_{12}$–$C_{22}$ trans unsaturated fatty acids.

18. A method in accordance with claim 15 wherein said second ester is a sucrose mono- fatty acid ester.

19. A method in accordance with claim 15 wherein said second ester is a polyglycerol fatty acid ester.

20. A method in accordance with claim 15 wherein said second ester is decaglycerol monostearate.

21. A method in accordance with claim 15 wherein said second ester is sodium stearoyl lactylate.

22. A method in accordance with claim 14 wherein the fatty acid component of each of said first and said second esters is selected from the group consisting of $C_6$–$C_{22}$ saturated and unsaturated fatty acids.

23. A method in accordance with claim 14 wherein the fatty acid component of each of said first and said second esters is selected from $C_6$–$C_2$ saturated fatty acids.

24. A method in accordance with claim 14 wherein each of said first and said second esters is present in the homogeneous mixture at a level of from about 25% to about 75% by weight.

25. A method in accordance with claim 14 wherein said heating is to a temperature of from about 180° F. to about 200° F. over a period of from about 10 minutes to about 30 minutes.

26. A method in accordance with claim 14 wherein said dispersion is cooled to a temperature of from about 130° F. to about 150° F. within about 30 minutes while stirring is continued.

27. A method in accordance with claim 14 wherein said second ester is a sucrose fatty acid ester which is selected from the group consisting of mon-, di- and tri-fatty acid esters.

28. A method in accordance with claim 14 wherein said ester mixture is added to said water at a level of from about 2% to about 20%.

* * * * *

UNITED STATES PATENT AND TRADEMARK OFFICE
CERTIFICATE OF CORRECTION

PATENT NO : 6,033,710
DATED : March 7, 2000
INVENTOR(S) : Miranda Miller et al.

It is certified that error appears in the above-identified patent and that said Letters Patent are hereby corrected as shown below:

TITLE PAGE

Under "[75] Inventor:" Please change the first inventor's name from "Mark S. Miller" to --Miranda Miller--.

Signed and Sealed this

Eighth Day of May, 2001

*Attest:*

NICHOLAS P. GODICI

*Attesting Officer*  *Acting Director of the United States Patent and Trademark Office*